Nov. 29, 1955  J. J. ALLEN  2,724,922

MECHANICAL BOLL WEEVIL CATCHER

Filed March 29, 1954  2 Sheets-Sheet 1

INVENTOR
Joseph J. Allen
BY
ATTORNEY

Nov. 29, 1955  J. J. ALLEN  2,724,922
MECHANICAL BOLL WEEVIL CATCHER
Filed March 29, 1954  2 Sheets-Sheet 2
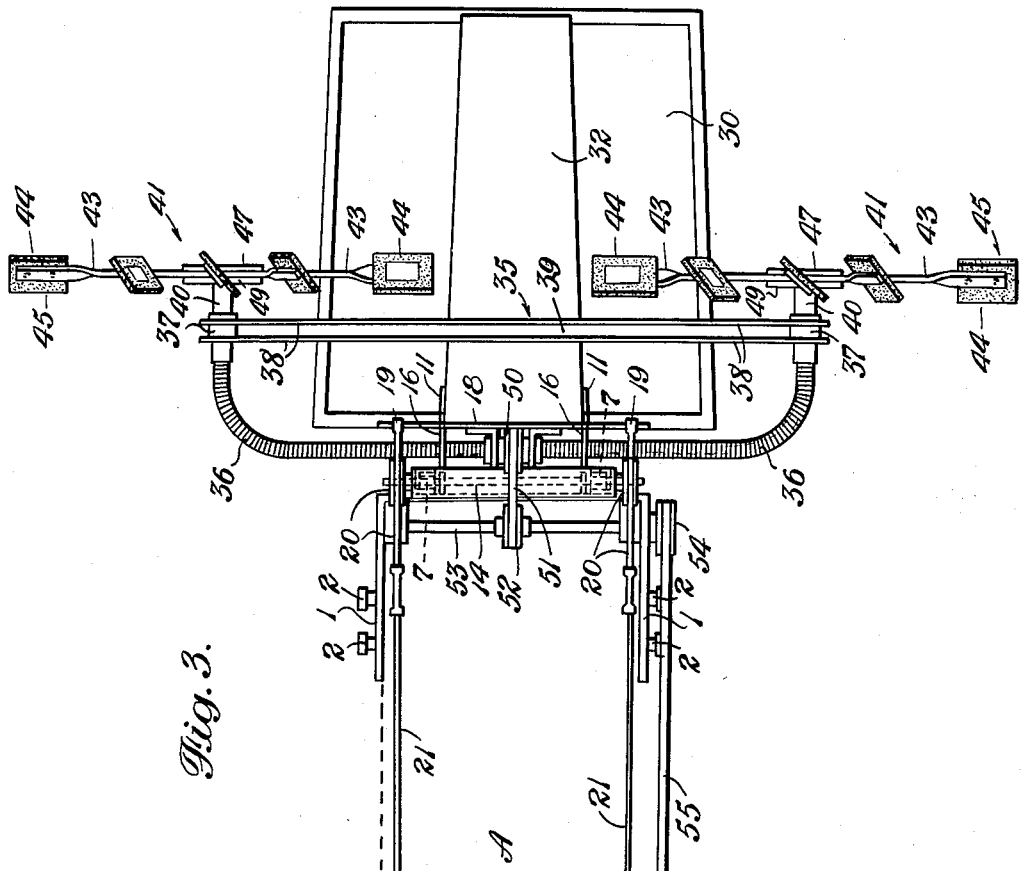
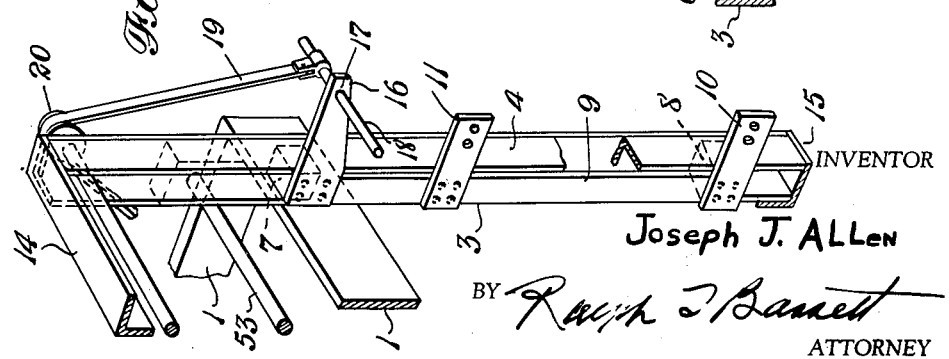
INVENTOR
Joseph J. Allen
BY
ATTORNEY United States Patent Office 2,724,922
Patented Nov. 29, 1955

2,724,922

MECHANICAL BOLL WEEVIL CATCHER

Joseph J. Allen, Allendale, S. C.

Application March 29, 1954, Serial No. 419,138

6 Claims. (Cl. 43—142)

This invention relates to improvements in boll weevil catchers of the general type shown in my prior U. S. Patent No. 2,564,774 issued August 21, 1951.

Boll weevils are particularly harmful to cotton crops and numerous methods and means have been provided for effecting their control. Unfortunately, control such as dusting operations are only effective in dry weather while on the other hand the boll weevils are tremendously productive regardless of the weather conditions, and it is estimated that one pair of boll weevils can produce 3,200,000 weevils in one season. Obviously there can be no period or season when a cotton farmer is not obliged, in order to have a successful cotton crop, to constantly fight this insect peril.

The present development comprehends an apparatus for control of boll weevils which is capable of use in any season and under any conditions and is just as effective during rainy seasons and under wet conditions as during dry seasons. Normally in the southern states boll weevils emerge from hibernation in early spring and as a rule have settled in a cotton field before the middle of June. Generally this period involves a wet season when many of the conventional methods of fighting the insect are not practical.

Generally the invention comprehends an attachment to a tractor, the attachment including a supporting frame to be connected to the front of the tractor, the supporting frame including vertical guideways, means for transmitting power from the tractor, beaters, means for driving the beaters from the source of power, and a catcher pan and associated parts, with the beaters and their driving means, together with the catcher pan, being vertically adjustable in the guideways through control mechanism available for actuation by the operator.

One of the main objects of the invention is to simplify the driving mechanism, reduce the weight of the mechanism, provide more positive and yet a simplified drive through the use of V-belts and flexible shafts, and otherwise generally improve the mechanism illustrated in my prior patent heretofore mentioned.

Numerous objects and advantages will more clearly appear by reference to the accompanying drawings forming a part of the present application, wherein like characters of reference designate corresponding parts throughout the several views, in which:

Fig. 3 is a top plan view;

Fig. 4 is an enlarged fragmentary perspective showing a portion of the frame and one of the guideways; and Fig. 5 is a transverse section through a guideway.

Figure 1:
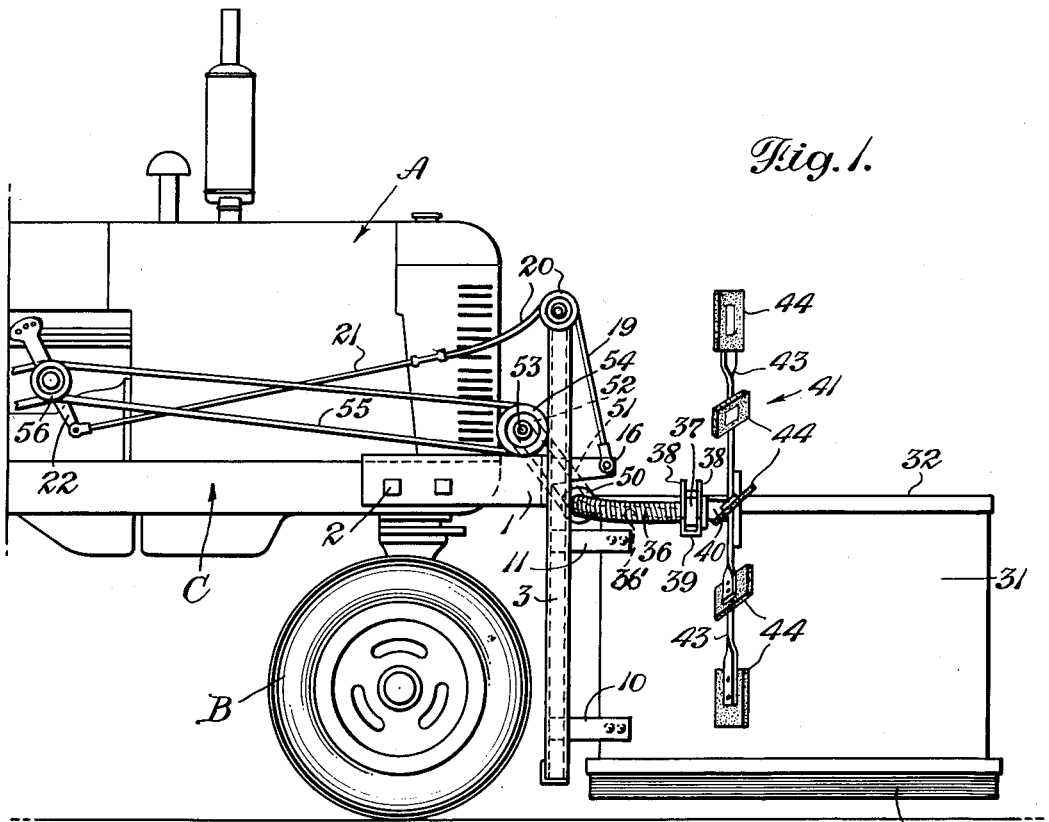
Fig. 1 is a side elevation showing the apparatus attached to a tractor.

The front of a conventional tractor is illustrated, the engine hood being indicated by reference character A, with the front wheels of the tractor shown at B. The tractor frame is shown at C and to the front of the tractor frame is attached the U-shaped support 1 having its arms connected to the side frame C of the tractor by bolts 2. This U-shaped supporting member 1 provides a supporting means for two vertical channels or guideways, one of which is shown in detail in Figs. 4 and 5. These guideways are fabricated from two vertical angle members 3 and 4 which have overlapping flanges at 5 riveted or bolted together as at 6 to provide vertical channels in which the mechanism is vertically adjustably supported. Supporting the mechanism and vertically adjustable in the guideways is a carrying frame including upper and lower spaced blocks 7 and 8, these blocks being connected by outer plate 9 which overlies the blocks 7 and 8 and to plate 9 are connected the supporting arms 10 and 11, these supporting arms 10 and 11 projecting outwardly from the guideways and being attached to the catcher mechanism as will be hereinafter described.

It will be noted that the guide channels formed by the angle parts 3 and 4 face inwardly and are vertically arranged and positioned adjacent the outer end portions of the front of the U-shaped supporting member 1, the arms of which are fixed to the side frame C of the tractor. The top and bottom of the guide channels are connected by forwardly facing angles 14 and 15, respectively, and extend transversely to brace the channels and retain them against misalignment. Further bracing and positioning is obviously accomplished by the main support 1, as best shown in Fig. 4.

At the upper end of each of the plates 9 and above the supporting plates 10 and 11 extend the forwardly projecting brackets 16, these brackets 16 being formed with aligned openings 17 adjacent their outer ends and through aligned openings 17 a transverse rod 18 extends, this rod 18 being fixed in position and being connected adjacent its outer ends with the straps 19 which extend about the pulley 20 and from the pulley 20 to the operating lever 21 connected to actuating arm 22 on the tractor.

The catcher mechanism is constructed and arranged to be vertically adjustable in the vertical channels supported by the tractor member 1, this mechanism including a pan structure 30 arranged medially of the assembly and in a hoirzontal position and side panels 31. The side panels 31 extend from the pan 30 vertically and are connected by top closure 32 and a bracing frame generally indicated by uprights 33. This catcher mechanism is of the general type shown in my prior Patent No. 2,564,774 and the side panels 31 and the pan 30 are rigidly related and retained in relative position so that the side panels 31 act as deflectors for deflecting the boll weevils knocked from the plants downwardly into the pan 30 which normally contains a destroying agent, usually in liquid form. The spaced side panels 31 are each connected at their inner ends to the arms 10 and 11 extending from the vertically adjustable structure supported in the inwardly facing channels heretofore described. The panels 31 may be connected as shown in Fig. 1 by welding, riveting, or otherwise, the connection being sufficiently rigid to retain the parts in their proper position and against sagging.

Extending transversely of the catcher mechanism and resting upon and supported by the top closure plate 32 is the horizontal support 35. This support 35 is formed by a pair of spaced parallel walls 38, best shown in Fig. 3. The projecting arms of the support 35 generally form cantilevers for carrying the ends of the rotating paddles 41 which are driven by flexible shafting or cable indicated at 36'. The ends of the shafting project through the spaced walls 38 of the support 35 and are provided with collars 37 which are arranged between the spaced walls 38 of the support 35, thereby providing against displacement of the flexible shafting which is normally contained within an outer flexible shield or casing 36. The collar 37 will be fixed to the shield 36 and will retain the same in position and simultaneously support the shafting 36' contained in the shield, the shafting extending through the shield and being provided with an enlarged head 40 for supporting the hubs 47—49 of the paddles 41. This fabricated structure of the support 35 necessarily provides rigidity and strength and at the same time contains elements suitable for maintaining the driving mechanism in its proper position for supporting and driving the paddles 41.

Figure 2:
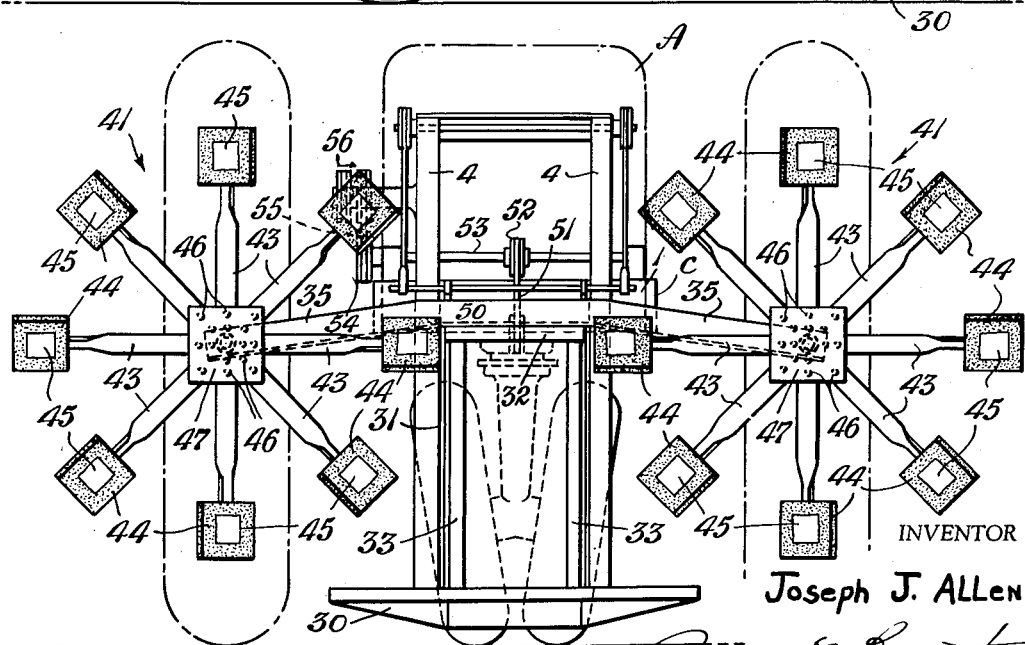
Fig. 2 is an end elevation.

The flexible shafting 36' and its casing 36 is shown as bent in generally U-form, see Fig. 3, and includes, as stated above, an outer shield as is conventional in such cases, and an internal drive shaft, the latter extending through the supporting collars 37 and being connected to a head 40 which is secured to the driven paddles 41, the latter being best shown in Figs. 1 and 2, and including a plurality of radiating arms 43 having flexible blades 44 at the ends of the arms 43 suitably reinforced by plates of suitable metallic material, as shown at 45, to give stiffness and strength to the structure. The arms 43, as shown in Fig. 2, are riveted as at 46 to the plate 47 forming a hub for each of the paddle arms, the hub being secured to the end of the drive shaft flange 49, as best shown in Fig. 3.

The flexible drive shafting 36' is of U-form and each end is connected to the driving head flange 49. The flexible shafting 36' is provided medially of its base with a V-pulley 50, this pulley being driven by the V-belt 51 driven by pulley 52 on drive shaft 53, the drive shaft 53 being driven by V-pulley 54 through V-belt 55 from the source of power at 56 mounted on and driven by the tractor.

By utilizing the flexible shafting 36' and mounting it in the manner shown the structure is sturdy and generally sufficiently flexible to withstand the general rough usage such devices are subjected to in use. Also by providing the single drive on the flexible shaft and medially thereof, the application of power is substantially simplified and the rotation of both paddles 41 inwardly towards the pan 30 is accomplished without the use of gearing or similar structure. At the same time the transfer of power from the tractor can be accomplished by the single belt 51 on the shaft 53, as best shown in Fig. 3. It will be obvious to one skilled in the art that the device is particularly desirable and has advantageous features due to the provision of the adjusting means, including the channel guides which are carried by the tractor, this mechanism as shown and described permitting quick adjustment without possibility of canting and binding of the parts. Also adjustment can be regulated to a minute degree to accomplish best results in accordance with the plants and the terrain on which the plants are grown.

Another desirable feature is the provision of a structure which can be adapted for use in connection with any standard tractor and the utilization of a control mechanism and a driving mechanism readily adapted to conventional tractor devices available on the market.

What I claim is:

1. In a boll weevil catcher attachment for use in connection with a power driven tractor, a pair of vertically arranged guide members rigidly fixed to the front of said tractor, a vertically adjustable carrying frame, including block elements arranged in guiding relation with said guideways, spaced arms projecting forwardly from said carrying frame, brackets carried by said frame, said brackets being positioned above said arms, flexible shafting mounted on said brackets and extending laterally of the tractor and forwardly thereof, paddle elements mounted at the ends of said shafts and driven thereby, a transverse brace supporting the end of said flexible shafting inward of said paddles, a pan structure supported at the bottom of said vertically adjustable members and positioned intermediate and below said paddles, means driven by the tractor rotating said flexible shafting and paddles, and means for adjusting said frame.

2. In a boll weevil catcher attachment for use in connection with a power driven tractor, a pair of vertically arranged spaced guide members rigidly fixed to the front of said tractor, said guide members being formed of inwardly facing channels, a vertically adjustable carrying frame arranged in guiding arrangement with said guide members, lower spaced arms projecting forwardly from said vertically adjustable members, a forwardly projecting pan supported near the bottom portion of said carrying frame by said spaced arms, spaced rectangular frames extending upwardly from the pan, a transverse support extending across said carrying frame, shafting supported at the upper portion of said carrying frame, said shafting extending transversely of the frame and projecting forwardly at each side thereof, the ends of said shafting being supported at the end portion of said transverse support, paddle wheels mounted on the ends of said shafting forward of the support, and driving means for said shafting, said driving means including a pulley medially fixed to said shafting and power transmitting means for driving said pulley.

3. The structure of claim 2 wherein the vertically adjustable carrying frame includes spaced blocks movable in said channels and a plate member connecting said blocks.

4. The structure of claim 2 wherein the forwardly projecting pan includes side panels and the shafting is flexible and is curved to extend forwardly from its medial portion to positions at each outer side of the side panels.

5. The structure of claim 2 wherein the transversely extending paddle support includes spaced side walls, and collars on the shafting embraced by said shafting to retain the shafting against movement transversely of the support.

6. The structure of claim 2 including a transverse bar, brackets extending from the vertically adjustable carrying frame, said transverse bar extending through said brackets, said bar extending beyond the frame, and flexible members connected adjacent the ends of said bar and adjustably supporting same.

References Cited in the file of this patent

UNITED STATES PATENTS

| | | |
|---|---|---|
| 756,650 | Keener | Apr. 5, 1904 |
| 2,564,774 | Allen | Aug. 21, 1951 |
| 2,621,460 | Haapala | Dec. 16, 1952 |